United States Patent [19]

Roensch et al.

[11] Patent Number: 5,069,286
[45] Date of Patent: Dec. 3, 1991

[54] METHOD FOR PREVENTION OF WELL FOULING

[75] Inventors: L. Frederick Roensch, Chagrin Falls; Kelvin Y. Chang, Solon, both of Ohio; Clarence T. Tanner, Arlington, Tex.

[73] Assignee: The Mogul Corporation, Chagrin Falls, Ohio

[21] Appl. No.: 516,177

[22] Filed: Apr. 30, 1990

[51] Int. Cl.$^5$ .............................................. E21B 37/08
[52] U.S. Cl. .................................... 166/312; 166/106; 166/250; 166/371
[58] Field of Search ................ 166/68.5, 62, 106, 250, 166/303, 305.1, 306, 310, 312, 371, 902; 252/8.552

[56] References Cited

U.S. PATENT DOCUMENTS

| | | | |
|---|---|---|---|
| Re. 32,866 | 2/1989 | Cruise | 166/371 X |
| 2,309,697 | 2/1943 | Gunderson | 166/312 X |
| 2,629,447 | 2/1953 | Nebolsine | 166/306 |
| 3,482,636 | 12/1969 | Crowe | 166/312 X |
| 3,528,503 | 9/1970 | Crowe | 166/312 X |
| 3,529,666 | 9/1970 | Crowe | 166/312 X |
| 3,547,194 | 12/1970 | Morine | 166/312 X |
| 3,827,977 | 8/1974 | Miles et al. | 166/310 X |
| 3,899,027 | 8/1975 | Jenkins | 166/312 X |
| 3,945,436 | 3/1976 | Nebolsine | 166/312 X |
| 4,762,626 | 8/1988 | Emmons et al. | 166/310 X |
| 4,830,111 | 5/1989 | Jenkins et al. | 166/312 X |
| 4,947,934 | 8/1990 | Hen | 166/310 X |

Primary Examiner—George A. Suchfield
Attorney, Agent, or Firm—Pearne, Gordon, McCoy & Granger

[57] ABSTRACT

This invention relates to a method for stabilizing and maintaining water wells penetrating a subterranean formation for the production of water which comprises adding to the wells at least one anionic polymeric sequesterant derived from a carboxylic acid and then subsequently treating the well water with a small but effective amount of at least one biocide.

22 Claims, 1 Drawing Sheet

METHOD FOR PREVENTION OF WELL FOULING

BACKGROUND OF THE INVENTION

This invention relates to the treatment of water wells and the procedure used in the treatment of water recycled through the well and the gravel pack. The procedure includes recirculating water and at least one additive through the well and a portion of the gravel pack. For example, water containing a sequesterant and then a biocide to effectively clean or otherwise treat the well and the gravel pack may be recirculated for a selected treatment period.

Water wells may become clogged with the formation of various metals, scaling carbonates, usually calcium or magnesium carbonates, as well as iron and various other metal oxides and hydroxides. The clogging or incrustation of the well screens and gravel pack reduces the production or capacity of the well, and attempts to treat these wells with different chemicals, including acids, to bring the carbonates, slime, manganese oxides and iron oxides which generally accumulate under control have not been very successful. Many wells become clogged or impede the flow of water by the formation of bacterial slimes. The bacterial slimes, together with other materials, including metal oxides, clays and various chemical precipitates, interfere with the flow of the water. Therefore, in the production of water from a subterranean formation, it is necessary that the well casing and the gravel pack be kept free of such materials. For example, after completion of the well, plugging or partial plugging of the perforations in the well casing will result due to the formation of scale and bacterial blockage.

Heretofore, in order to avoid these problems, the wells were cleaned by introducing into the well solutions containing chlorine-containing compounds in order to kill the bacteria. The prior art teaches various methods of cleaning wells blocked by bacterial slimes, algae, and the like by incorporating a biocide such as sodium hypochlorite together with acid treatments which open the blockage by chemical action. Presently, there is no good proven method for cleaning water wells and keeping such wells open for extended periods of time. Treating water wells and well screens or perforations with acids has been effective particularly for the removal of scale and metal oxides. However, the use of acids has several disadvantages, especially if the formation is particularly subject to rapid formation of scale. In subterranean formations, for example, the water contains various soluble carbonates and bicarbonates of calcium and other polyvalent cations such as barium, magnesium, iron and the like, which form insoluble compounds, which tend to precipitate at the points where the pressure in the formation is reduced and the pH rises. These reduced pressure areas are adjacent to the well or in the perforations of the well casing, and therefore the production of the water is substantially restricted due to the formation of scale, slime, and the like. Acid use can also severely damage the pump, destroy sacrificial anodes used to protect the pump from corrosion, and also may present a difficult, hazardous storage, handling, and disposal problem.

SUMMARY OF THE INVENTION

In accordance with the present invention, a water well treatment and procedure are provided wherein water containing at least one additive is recirculated through the well. The recycle flow is through an adjacent part of the gravel pack along a predetermined flow path.

It is a purpose of this invention to provide a method of treating water wells wherein all or a portion of the water produced is recycled with water containing a polymeric sequesterant, followed by treatment with at least one biocide. The treatment of the well is accomplished with a recycle loop wherein the water containing the sequesterant to which the biocide is subsequently added flows down the casing and up the center column or tubing.

It is another purpose of this invention to provide a method wherein the inner surface of the casing, the inner and outer surfaces of the well column, and the gravel pack are subjected to cleaning by circulating in the system a polymeric sequesterant and a biocide.

It is another purpose of this invention to provide a method for chemically treating water wells by incorporating in a closed system at least one water-soluble polymeric sequesterant followed by treatment with a biocide.

It is still another purpose of this invention to provide a method of treating water wells to reduce the incrustation of the well screens and gravel pack around said well and to reduce and eliminate blockage due to a combination of bacterial slimes, iron oxide, iron hydroxides, manganese oxides, calcium carbonate, and the like.

In a preferred arrangement, a sealing member is positioned in the well casing to direct recycle flow through the adjacent portion of the gravel pack. The sealing member is arranged to direct flow through first perforations or well screens into the gravel pack for subsequent re-entry into the well casing through second perforations or well screens.

DETAILED DESCRIPTION OF THE INVENTION

Figure 1:
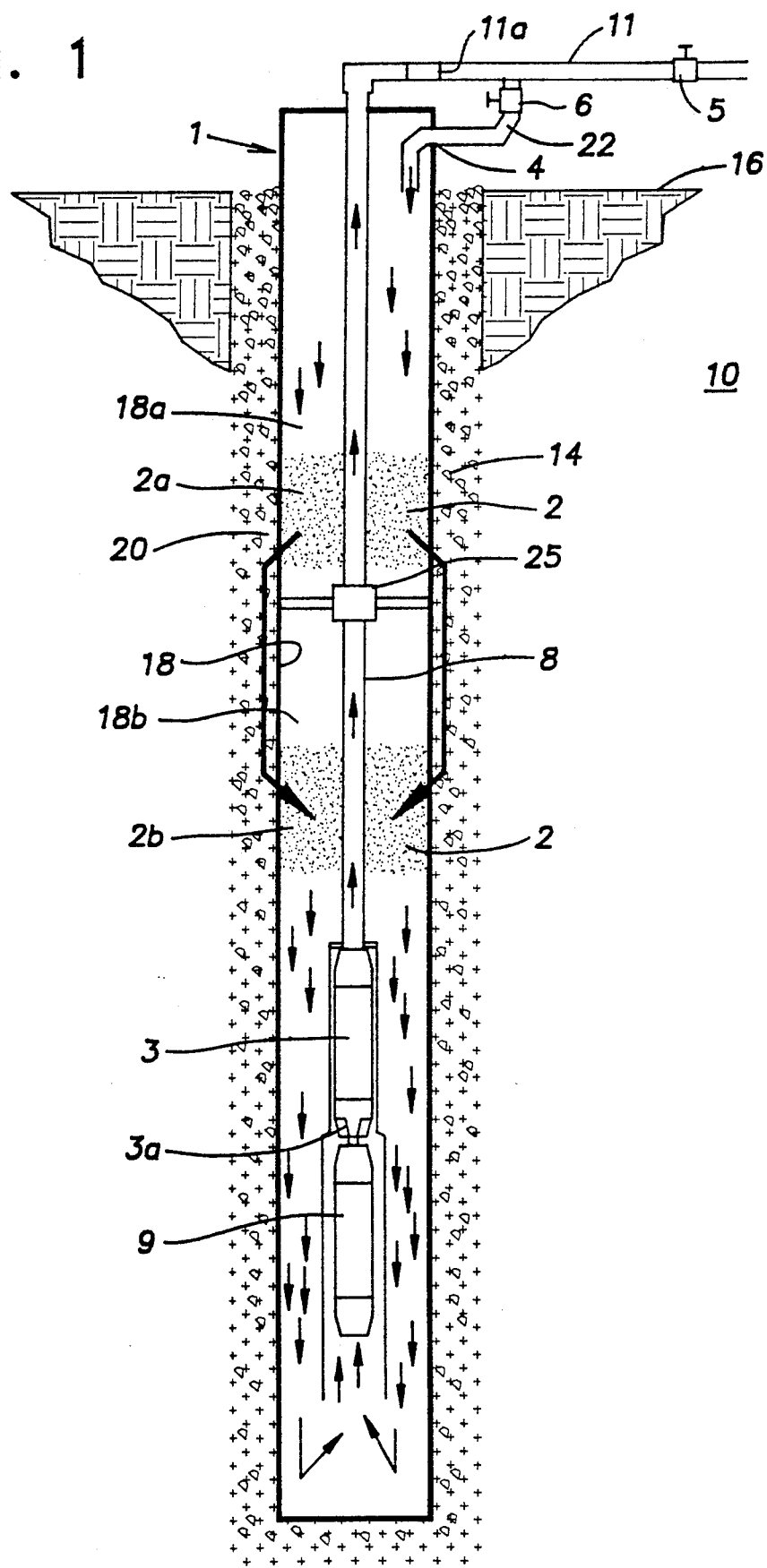
FIG. 1 is a schematic sectional view of a water well arranged for recycle flow for well treatment in accordance with the invention.

FIG. 1 is a schematic diagram of a cased well 1 penetrating a subterranean formation 10. A well bore 14 penetrates the formation 10 from an exposed surface 16 thereof. The cased well 1 includes an outer casing 18 held in place by gravel pack or cement 20 extending from the exposed surface 16 downwardly through the formation 10.

The casing 18 includes a cylindrical wall connecting closed top and bottom end walls and a longitudinal axis extending downwardly into the formation 10. The cased well 1 also includes a central production column 8 which generally extends along the longitudinal axis of the casing 18. A multistage pump 3 having intake ports 3a and associated pump motor 9 are mounted to the lower end of the column 8. The pump 3 cooperates with the column 8 to flow liquid within the casing 18 upwardly to the surface and into a conveyance line 11. A discharge valve 5 is mounted in the line 11 to direct liquid which has been recycled to a suitable disposal such as a pond or further processing station.

The casing 18 includes a plurality of perforations 2 extending through its cylindrical wall for admitting water from the formation 10 into the casing 18. The perforations may be of any suitable shape, such as slits, and may be provided as screens. Herein, an upper array of perforations 2a is longitudinally spaced from a lower array of perforations 2b.

In accordance with the invention, a packer 25 is inserted into the casing annulus and a fluidtight seal is formed with the cylindrical wall of the casing intermediate the upper and lower array of perforations 2a and 2b. Accordingly, the packer 25 also divides the casing into an upper interior region 18a and a lower interior region 18b.

A recycle line 22 is arranged to provide fluid communication between the conveyance line 11 and the upper region 18a of the casing 18 via an opening 4 in the wall of the casing 18. To provide recycle, the discharge valve 5 is closed to prevent flow through the line 11 and a recycle valve 6 is opened to permit flow through the line 22 and into the casing 18. A monitoring device 11a, such as a removable stainless steel screen, is provided in the line 11 to assess the state of fouling.

The well provides an ideal area for growth of various forms of bacteria. In fact, it has been found that masses of bacteria will grow at the perforations 2, and as the bacteria develop, they form a covering or skin around the bacteria mass. It is known that when first drilling a well, more oxygen is allowed to the subterranean area than previously had been available, and therefore, in conjunction with the presence of iron and carbon sources, the growth of iron depositing and slime forming bacteria is enhanced. Thus, the bacterial mass will attach to the well casing adjacent perforations 2 and may extend throughout the gravel pack 20 which was intended to keep the surrounding area porous. In fact, it was found that bacteria may extend further into the surrounding formation 10. The bacteria also accumulates on the well interior surfaces and may tend to interfere with the well operation by blocking or restricting flow through pump intake ports 3a. While bacterial slime accumulation is the major problem, it is also known that bacteria produce additional contaminants, such as ferric oxide, which adds to the overall problem.

In practice, after the well bore 14 has been drilled, as shown in the drawing, production of water from the formation 10 is obtained by the flow of the water through the perforations 2 into the well casing 18, with the water being recovered from the casing 18 by operation of the pump 3 to cause the upward flow of liquid through the column 8. In addition, a variety of other well known techniques can be used for the recovery of water from the formation.

According to this invention, in the production of water from the formation 10, slime, iron oxides, and/or manganese oxides have a tendency to deposit in the areas where the water is oxygenated. Calcium carbonate scale forms where water pressure is reduced and the pH rises as the water flows into the well. These areas are typically located adjacent the perforations 2. Accordingly, since these are areas of somewhat constricted flow, the formation of the bacterial slimes, oxides or scale will result in a substantial reduction in the production of water from the formation 10. These deposits of slime, oxides or scale can be controlled in accordance with this invention by pumping a water-soluble polymeric sequesterant derived from a carboxylic acid through the recycle line 22 and into the casing 18, and thereafter pumping an effective amount of a biocide in the vicinity of the perforations 2 by means of pump 3 and associated drive motor 9. Treatment of the well water with the polymeric sequesterants binds the iron and manganese or inhibits calcium and prevents the build-up in the well casing 18 at the perforations 2 and the formation 10. Thereafter, the biocide is added and maintained in contact with the casing 18 and perforations 2 for a sufficient amount of time to destroy and control the slime build-up. The contact time may range anywhere from about 5 minutes to several hours, depending on the recycling procedure.

More specifically, approximately 1 to 500 parts per million of the polymeric sequesterant per million parts by weight of the water are introduced, in a conventional manner (not shown), into the upper region 18a of the casing 18 through opening 4 and recycled via line 22. The pump 3 is operated and the water is recirculated for at least about 5 minutes, or longer, i.e., anywhere from 15 minutes to five hours. The monitoring device 11a is checked to assure complete recirculation and stabilization of the sequesterant. Subsequently, the pump 3 is turned off and approximately 1 to 800 parts by weight per million parts by weight of water, and, more preferably, 10 to 300, e.g., about 200 ppm, of a bactericide is added. Again, the pump 3 is turned on, recirculating the bactericide for effective periods ranging anywhere from several minutes to 6.0 hours, and, more typically, from 0.5 hours to 3 hours, depending on the degree of accumulations. At intervals of approximately one hour, samples of the recirculating water may be tested. The discharge valve 5 is opened and the recirculating valve 6 is closed, permitting free flow of the recycle liquid and water from the well to a suitable disposal such as a pond. The procedure is repeated until testing indicates proper well water stabilization and bacterial control.

Referring to the drawing, by closing valve 5 and opening valve 6, a substantially constant amount of recirculation water will be recycled through the recycle line 22 down through the casing 18, through the perforations 2, and up through a center pipe 8. Specifically, the recirculation water together with the sequesterant and then the biocide will flow along a liquid flow path extending through the upper region 18a, the upper array of perforations 2a, the gravel pack 20, the lower array of perforations 2b, the lower region 18b of the casing 18, and upwardly through the production column 8 into the line 11 for recycle through line 22. The recycle operation is continued for a sufficient time to stabilize any iron, manganese, or calcium and clear any bacterial slime and/or incrustations that accumulate at the areas of the perforations 2 and pump 3.

The process in accordance with this invention will produce an increase in the porosity and permeability of most water wells and, when using the process on a preventive maintenance program, high yields from the well head will be maintained. In many instances, original specific capacity of the well is restored. Since it is not necessary to remove the pump from the well, the downtime is minimized and the treatment and cleaning process is obviously more economical.

The centrifugal pump 3 and motor 9 are positioned in the lower region 18b of the casing 18, with the packer 25 being provided above the pump and between the upper and lower arrays of perforations 2a and 2b. Various installation requirements can be included in a shallow well or a deep well, and with various types of casings, perforations, well screens, pumps, and aquifers. The recirculated water may be heated with the chemicals incorporated therein, the various parameters of chemicals, time, and temperatures also being varied depending on the condition of the well.

In accordance with this invention, various polymeric sequestering agents prevent iron or manganese oxidation in the well by binding the iron to form a soluble complex which does not tend to foul or plug the casing perforations. More specifically, well water generally exists under reducing conditions where the iron or manganese is present primarily as ferrous iron (Fe+2) or manganous (Mn+2). However, upon exposure to air, the ferrous iron oxidizes to ferric ions (Fe+3). From known solubility data, the Fe+2 ion is $10^{15}$ times more soluble at a pH 7 than the Fe+3 ion. Thus, iron is soluble in ground water as Fe+2, but upon being exposed to air or other oxidizing agents, the iron becomes insoluble and, with the associated bacterial growth, is one of the most troublesome in fouling water treating systems. However, the addition of a polymeric sequesterant in accordance with this invention inhibits the deposition of iron or manganese by chelation of the iron. Although the mechanism is not completely understood, it is thought that the Fe+2 ion, being small and highly charged, attracts the polymer, causing a soluble, stable iron or manganese polymeric complex.

Accordingly, this invention is directed to a method of inhibiting fouling and scaling caused by the precipitation of ferric ions and other metal cations. Certain water-soluble, anionic polymeric sequesterants inhibit fouling and corrosion in well water systems.

Various unsaturated carboxylic acids or salts thereof may be used as the monomers in preparing the polymeric sequesterants for purposes of this invention. For example, acrylic acid, methacrylic acid, maleic acid, itaconic acid, vinyl acetic acid, fumaric acid, carboxyalkyl acrylic acid, and the salts and mixtures thereof may be used in preparing polymeric sequesterants. The preferred carboxylic acids are acrylic acid, methacrylic acid, β-carboxyethyl-acrylate, maleic acid, fumaric acid, itaconic acid, and their salts. The most preferred carboxylic acids are acrylic acid, methacrylic acid and their salts. Other acids and derivatives thereof include 2-acrylamido-2-methylpropylsulfonic acid, 2-methacrylamido-2-methylpropylsulfonic acid, styrene sulfonic acid, vinyl sulfonic acid, sulfoalkyl acrylate or methacrylate, allyl sulfonic acid, methallyl sulfonic acid, 3-methacrylamido-2-hydroxy propyl sulfonic acid, sulfonic acid acrylate, and mixtures thereof. The preferred sulfonic compounds are 2-acrylamido-2-methylpropylsulfonic acid, 2-methacrylamido-2-methylpropylsulfonic acid, allyl sulfonic acid, styrenesulfonic acid, vinylsulfonic acid and their salts. The most preferred sulfonic acids are 2-acrylamido-2-methylpropylsulfonic acid, 2-methacrylamido-2-methylpropylsulfonic acid and their salts.

The polymers of the instant invention may be prepared from homopolymers of unsaturated carboxylic acid, copolymers from 35 to 95% by weight of an unsaturated carboxylic acid or salt, and from 5 to 65% by weight of an unsaturated sulfonic acid, or salt. Other polymers of this invention are prepared from 35 to 95% by weight of an unsaturated carboxylic acid or its salt, and from 5 to 65% by weight of an unsaturated, pendant polyalkylene oxide compound. The polymers may be prepared by mixing the monomers preferably in the presence of a free radical initiator. Any free radical initiator may be used. Examples include peroxides, azo initiators, and redox systems. The polymerization may be initiated photochemically. The preferred catalysts are sodium persulfate and sodium metabisulfite or a mixture of ammonium persulfate and any azo-type initiator, such as 2,2'-azobis-(2,4-dimethyl-4-methoxyvaleronitrile).

The polymerization may be conducted by any of a variety of procedures, for example, in solution, suspension, bulk and emulsion. The reaction will generally occur between 10° and 100° C. The reaction, depending on the temperature, generally takes from 5 minutes to 12 hours. Measuring for residual monomer will verify when the reaction is complete.

The polymers are initially identified by intrinsic viscosity. The preferred intrinsic viscosity ranges from 0.05 to 2.5, preferably 0.05 to 0.5 dl/g, in 1.0M sodium chloride (measured on a 75 Cannon Ubbelohde capillary viscometer).

Preferred homopolymers, copolymers, and terpolymers are derived from acrylic acid and its derivatives having the structure

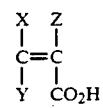

wherein X, Y, and Z, which may be the same or different, are either hydrogen, $CH_3$, $CO_2H$, $CH_2CO_2H$, $CH_2OH$, $CH_2CH_2OH$, or $CH_2CH_2CH_2OH$.

Some of the preferred polymers particularly useful as the sequesterant for purposes of this invention include tetrapolymers derived from acrylic acid, acrylamide, methacrylic acid, and ethoxyethoxyethylacrylate, available under the trademark GOODRITE K-796, copolymers derived from acrylic acid, and acrylamidomethylpropanesulfonic acid, terpolymers derived from acrylic acid-acrylamidomethylpropanesulfonic acid-vinyl acetate, copolymers derived from styrenesulfonic acid-maleic anhydride, terpolymers derived from acrylic acid-acrylamidomethylpropanesulfonic acid-phosphinocarboxylic acid, available commercially as BELCLENE-400, terpolymers derived from acrylic acid-methacrylic acid, and itaconic acid, polymaleic anhydride available commercially as BELCLENE-200, terpolymers derived from maleic anhydride-vinyl acetate-ethylacrylate, commercially available as BELCLENE-283, and copolymers derived from acrylic acid and acrylamide, available as CYANAMER P-70.

In addition to the treatment of the well water with the polymeric dispersants, it is essential to add, after the addition of the sequesterant, small but effective amounts of at least one biocide to control the microorganism content of the water. Generally, the addition of an oxidizing biocide, such as chlorine, hydrogen peroxide, permanganate, or ozone, oxidizes the ferrous iron to ferric or manganese to manganese oxides, causing precipitation thereof. However, by the addition of the sequesterant prior to the treatment of the water with the biocide, the metal ions, including manganese and iron, are sequestered with the polymer, and therefore do not precipitate. The oxidizing biocides which are particularly useful include the organic compounds such as the aldehydes, the halogen-containing compounds, comprising the inorganic hypochlorite salts, hypochlorous acid, hypobromous acid, chlorine, bromine, the peroxides, ozone, permanganate, and the like. Non-oxidizing biocides include glutaraldehyde. The biocides are generally added to the water systems in small but effective amounts to control the microbiological growth, e.g., as little as 1.0 and up to about 800 ppm, and more likely in amounts ranging from about 10 to 300 ppm.

In accordance with this invention, to prevent iron or manganese oxidation or calcium carbonate precipitation, and slime buildup, well water is first treated with effective amounts, e.g., from 1 up to 500 or 1 to 100 parts per million, of a water-soluble anionic polymeric sequesterant derived from an unsaturated carboxylic acid such as polymeric acrylic acid having average molecular weights ranging up to about 100,000, and preferably 2000 to 10,000, and then subsequently adding to the well treated with the sequesterant a small but effective amount of at least one biocide, such as chlorine and/or hydrogen peroxide, ozone, permanganate, or an aldehyde, in amounts ranging from 1 to 800 ppm.

Without the treatment as provided herein, the biological fouling and mineral deposits, particularly iron and bacteria, will build up on the well surfaces, thereby reducing the efficiency of the well. By following the appropriate treatment, not only is the efficiency of the well maintained, but also expensive acid cleanups are avoided. In the past, when the wells were fouled, it was necessary to clean the system with strong acids. This was accomplished by shutting down the well for extended periods of time while treatment was taking place, resulting in loss of time and increasing the environmental problems.

While this invention has been described with respect to a number of embodiments, it is obvious that there are other variations and modifications which can be employed without departing from the spirit and scope of the invention as set forth in the appended claims.

The invention claimed is:

1. A method of cleaning and maintaining a water well penetrating a subterranean formation for the production of water which comprises treating said well by recirculating water through the well, adding an aqueous solution of an anionic polymeric sequesterant into said well in an amount and for a period of time effective to sequester metal cations and subsequently adding to said well an effective amount of at least one biocide.

2. The method of claim 1, wherein the polymeric sequesterant has an average molecular weight ranging up to about 50,000 and is derived from an acrylic acid.

3. The method of claim 2, wherein the biocide is a halogen-containing biocide added in an amount ranging from about 1 to 800 parts per million parts by weight of water.

4. The method of claim 2, wherein the biocide is hydrogen peroxide, ozone or permanganate.

5. The method of claim 2, wherein the biocide is glutaraldehyde.

6. The method of claim 3, wherein the polymeric sequesterant is a polymer derived from maleic anhydride.

7. The method of claim 3, wherein the polymeric sequesterant is a terpolymer derived from acrylic acid, acrylamide, methacrylic acid, and ethoxyethylacrylate.

8. The method of claim 1, wherein the anionic polymeric sequesterant is derived from acrylic acid having an average molecular weight ranging up to about 100,000 and is added to the well in an amount ranging from about 1 to 800 parts per million parts by weight of the water.

9. The method of claim 1, wherein the anionic polymeric sequesterant is derived from an unsaturated carboxylic acid having an average molecular weight ranging from about 2000 to about 10,000 and added to the well water in an amount ranging from about 1 to 500 parts per million parts by weight of the water.

10. The method of claim 9, wherein at least one halogen-containing inorganic compound is added to the well water in an amount ranging from about 10 to about 300 parts per million parts by weight of the water for periods of time ranging from about several minutes to about 6 hours.

11. The method of claim 10, wherein said water well includes an outer casing which is surrounded by a gravel pack, said casing having a longitudinal axis extending from an exposed surface of the formation downwardly into the formation, a casing interior having separated upper and lower regions, and longitudinally spaced upper and lower arrays of perforations for admitting water from the formation into the casing, said sequesterant and thereafter said biocide being added to said upper interior region of said casing, and recirculating said water sequesterant and subsequently added biocide along a liquid flow path through said upper region of said casing, said upper array of perforations, an adjacent portion of said gravel pack, said lower array of perforations and said lower region of said casing.

12. The method of claim 11, including the step of inserting a sealing member into said casing and forming a fluidtight seal between said sealing member and casing to divide said casing into said upper and lower regions.

13. The method of claim 1, wherein said water well includes an outer casing which is surrounded by a gravel pack, said casing having a longitudinal axis extending from an exposed surface of the formation downwardly into the formation, a casing interior having separated upper and lower regions, and longitudinally spaced upper and lower arrays of perforations for admitting water from the formation into the casing, said sequesterant and thereafter said biocide being added to said upper interior region of said casing, and recirculating said water, sequesterant and subsequently added biocide along a liquid flow path through said upper region of said casing, said upper array of perforations, an adjacent portion of said gravel pack, said lower array of perforations and said lower region of said casing.

14. The method of claim 1, wherein said biocide also oxidizes metal cations present in water from the formation and said sequesterant reduces the amount of metal precipitated due to the circulation of the biocide as compared to the amount of metal which would be precipitated by circulation of the biocide without first circulating said sequesterant.

15. A method of cleaning and maintaining a water well penetrating a subterranean formation, said water well including an outer casing having a longitudinal axis extending from an exposed surface of the formation downwardly into the formation and longitudinally spaced perforations for admitting water from the formation into the casing, comprising the steps of recirculating water from the well, adding to the recirculation water an aqueous solution of an anionic polymeric sequesterant in an amount effective to sequester metal cations present in the recirculation water, causing the recirculation water and sequesterant to flow along a liquid flow path through the casing, said perforations and a portion of said formation adjacent to said casing, subsequently adding an effective amount of a biocide to the recirculation water and further recirculating the recirculation water, sequesterant and biocide along said flow path.

16. The method of claim 15, wherein said perforations include an upper array of perforations longitudinally spaced from a lower array of perforations and including the step of separating said arrays of perforations with a sealing member arranged to divide said casing interior into upper and lower regions respectively containing said upper and lower arrays of perforations, and said recirculating steps include causing flow along said liquid flow path sequentially through said upper region of said casing, said upper array of perforations, said adjacent portion of said formation, said lower array of perforations, and said lower region of said casing.

17. The method of claim 16, wherein said water well includes a central production column surrounded by said casing and pump means for flowing liquid within said lower casing region upwardly through said column to the exposed surface of the formation, and said recirculating steps further include causing flow from the lower region of said casing upwardly along said liquid flow path through said production column to said exposed surface and then through a recycle line for return to said upper casing region.

18. The method of claim 17, wherein said biocide also oxidizes metal cations present in water from the formation and said sequesterant reduces the amount of metal precipitated due to the circulation of the biocide as compared to the amount of metal which would be precipitated by the circulation of the biocide without first circulating said sequesterant.

19. The method according to claim 18, wherein said sequesterant is derived from acrylic acid and said biocide is an oxidizing biocide selected from the group consisting of aldehydes, halogen-containing compounds, peroxides, ozone, and permanganate.

20. A method of cleaning and maintaining a water well penetrating a subterranean formation, said water well including an outer casing which is surrounded by a gravel pack, said casing having a longitudinal axis extending from an exposed surface of the formation downwardly into the formation and longitudinally spaced perforations extending through the outer casing for admitting water from the formation into the casing interior, said perforations including an upper array of perforations longitudinally spaced from a lower array of perforations, comprising the steps of separating said arrays of perforations with a sealing member arranged to divide said casing interior into upper and lower regions respectively containing said upper and lower arrays of perforations, recirculating water from the well, adding to the recirculation water an aqueous solution of a polymeric sequesterant in an amount effective to sequester metal cations, causing the recirculation water and sequesterant to flow along a liquid flow path sequentially through said upper region of said casing, said upper array of perforations, an adjacent portion of said gravel pack, said lower array of perforations, and said lower region of said casing, and then adding and recirculating biocide along said liquid flow path.

21. The method of claim 20, wherein the step of separating said arrays with said sealing member includes inserting said sealing member into said casing and forming a fluidtight seal between said sealing member and casing to separate said casing into said upper and lower regions.

22. The method of claim 21, wherein said water well includes a central production column surrounded by said casing and pump means for flowing liquid within said lower casing region upwardly through said column to the exposed surface of the formation, and said recirculating step further includes causing flow from the lower region of said casing upwardly along said liquid flow path through said production column to said exposed surface and then through a recycle line for return to said upper casing region.

* * * * *